United States Patent Office 3,223,839
Patented Dec. 14, 1965

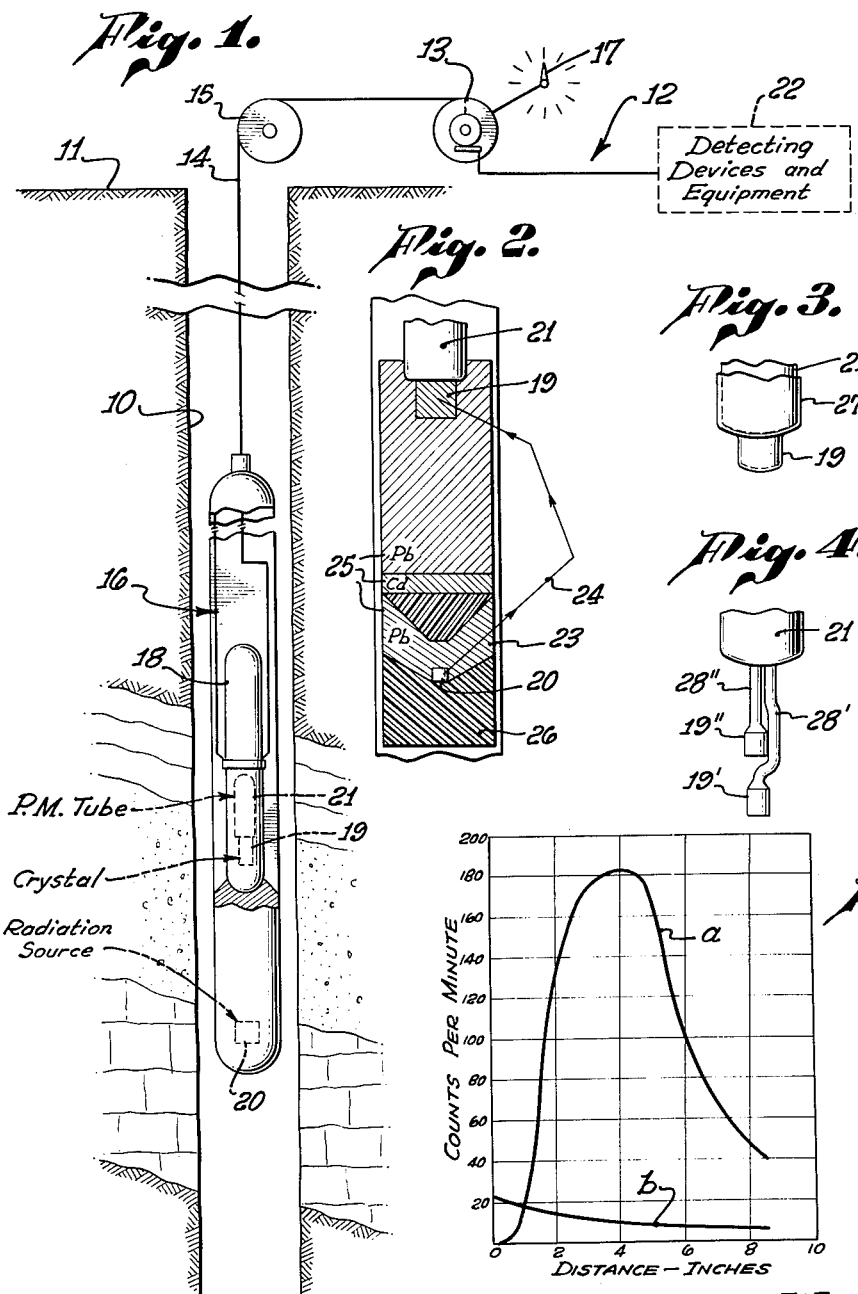

3,223,839
APPARATUS FOR EXPLORING GEOLOGICAL STRATA UTILIZING A NEUTRON SOURCE AND DETECTOR
Philip W. Martin, 1345 West Road, Whittier, Calif., and Robert W. Pringle, 460 Wellington Crescent, Winnipeg, Manitoba, Canada
Filed June 2, 1952, Ser. No. 291,104
3 Claims. (Cl. 250—83.1)

The present invention relates generally to the art of geophysical exploration, and is more particularly concerned with an improved method and apparatus for conducting exploratory investigations of surface strata as well as underground formations in the vicinity of bore holes for the purpose of determining its nature and characteristics.

Heretofore, two basic methods or systems have been proposed to investigate underground formations, for example in bore or drill holes, by bombarding the elements in the formation by radiations such as fast neutrons from a suitable source.

The first of said systems utilizes a neutron source from which the adjacent formation of the bore is bombarded, and detecting means directly shielded from the neutron source are utilized in the form of an ionization chamber for detecting capture gamma rays which may be induced in the formation. The operation of this system is predicated upon the slowing down of the neutrons by collision with hydrogen nuclei and scattering. Thus the counter should have a low count in hydrogen bearing formations, but where the formation is dry the neutrons move out through the formation to the vicinity of the counter, where gamma rays are produced by neutron capture and thus dry formations are indicated by higher count rate than formations containing water or oil.

An inherent draw-back to this system resides in the fact that the counter may give an erroneous result due to chemical and physical characteristics of the formation and the problem of capture cross-section of various elements which may be present in the formation. The capture cross-section of various elements measured in "barns" varies considerably for different elements, and the nature and energy of the capture products also varies greatly. For example, the capture cross-section for hydrogen is in the order of .3 barns, while that of cadmium is 3500 barns. Thus, traces of certain elements in the formation may result in the capture of a great number of neutrons so that a count might be obtained which would be indicative of a very wet formation, whereas in reality the formation might be very dry.

The second basic system heretofore proposed differs from the first system in that the scattered thermal or slow neutrons from the formation are captured in the counter by associating with the ionization chamber a material such as boron, nickel or cadmium, which has the property of disintegrating when exposed to the action of slow or thermal neutrons especially, neutrons whose velocity has been reduced by passage through a medium comprising low atomic weight elements such as hydrogen. As in the first system, the presence of elements in the formation which have large capture cross-section will result in the capture of slow neutrons in the formation. Since the slow or thermal neutrons are much more readily captured than the fast neutrons, only a relatively few slow neutrons will reach the counter. Thus the counter would indicate stoppage of the neutrons in the formation, as would be the case in a wet formation, and thus give an erroneous reading.

With the foregoing disadvantages inherent in the presently known systems of neutron logging, the present invention proposes to minimize the unknown factors which may appear in the measurements so that the obtained data will more reliably and correctly indicate the formation structure characteristics.

To this end, the present invention proposes a system wherein high-speed or fast neutrons are utilized to bombard the formation and means are provided for detecting the scattered fast neutrons after only a relatively few collisions, and before the velocity or energy of fast neutrons has been reduced to an energy level of slow or thermal neutrons. In the system of the present invention, the scattering and slowing down of the fast neutrons become a very important consideration, whereas the thermal capture cross-section of the elements becomes a negligible factor in the operation, it being noted that the capture process was an essential part of the previously known systems described above. As a consequence the system of the present invention provides a more true indication of hydrogen content in the formation.

From studies which have been made in connection with the transmission of slow or thermal neutrons and fast neutrons through a hydrogen containing material, a striking difference appears with respect to the decrease in the number of neutrons as the path through the material increases. For the slow or thermal neutrons, the number rises rapidly to a peak, and then falls off at an equally rapid rate, whereas in the case of fast neutrons, the neutrons decrease quite uniformly. It should thus be apparent that a system which depends upon the slow neutron as principal basis for its operation is faced with a complex problem, since it is not apparent whether the change in count results from a high or low hydrogen content of the formation, or whether it comes about by virtue of the distance through which the slow neutron has traveled in the formation. On the other hand the present invention has for an object the elimination of the foregoing difficulty by making use of fast neutrons which decrease rather uniformly as the distance through the material increases, thus permitting the obtaining of more reliable information as to the characteristics of the formation.

Another object of the invention is to provide novel means for detecting the effect of scattered fast neutrons in the detecting means of a tool utilized for bore hole surveys.

Still another object is to provide novel means for increasing the sensitivity of the detecting apparatus, by providing light conducting pipes by means of which the scintillations from a plurality of crystals may be concentrated on the photo-electric responsive means of the detecting apparatus.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a view generally illustrating apparatus embodying the present invention, and by means of which the herein described method may be practiced;

FIG. 2 is an enlarged view schematically showing details and interrelation of the neutron source and detecting means of the present invention;

FIG. 3 is a fragmentary view illustrating a modification in the detecting means;

FIG. 4 is a fragmentary view illustrating the utilization of light pipes interconnecting the pick-up crystals with photo-electric responsive means; and FIG. 5 is a graph showing the interrelationship between fast neutrons and slow neutrons and the manner in which their abundances vary with distance of travel through a medium.

Referring now to the drawings, FIG. 1 represents a typical well bore structure 10 which passes from the ground surface 11 downwardly through a plurality of different formation structures which have been distinguished in the drawing by means of various types of shading.

At the ground surface, there is illustrated a surface station as generally indicated by numeral 12, and which includes suitable hoisting equipment which may comprise, for example, a hoisting drum 13 from which a hoisting cable conductor 14 is trained over a guide pulley 15 and connected to an exploration unit within the well bore, as generally indicated by the numeral 16.

As shown, the hoisting drum is provided with suitable indicating mechanisms, which may comprise a rotating pointer 17 associated with a graduated dial, or other suitable means for indicating the amount of cable which has been wound and unwound thereon, or in other words the position of the exploration unit within the well bore. With the equipment briefly described above, the exploration unit may be readily controlled and moved within the well bore in carrying out the logging operation and the method of the present invention. It will, of course, be appreciated that when strip recorders are utilized their linear travel will be coordinated with cable travel.

It will be appreciated that the exploration unit may assume various forms of construction. For purposes of illustration, the exploration unit is shown herein as comprising a cell structure 18 within which there is mounted a scintillation crystal 19 or other suitable means having the property of reacting under the effect of fast neutrons. For such purpose, we have utilized with a suitable cooling system which may be as described in our hereinafter mentioned copending application, an anthracene crystal which is a hydrocarbon having the ability to scintillate under the effect of fast neutrons. However, stilbene or one of the liquid or plastic organic scintillators could have been used. Thus, fast neutrons from a radiation source, as indicated at 20, upon being scattered by the adjacent bore formation elements may strike the crystal 19, the scintillations of which are arranged to control a photo-electric multiplier tube 21 or other suitable means for converting the scintillations into pulses of current. The photo-electric tube 21 is connected through suitable circuit devices with surface detecting devices and equipment as generally indicated by the numeral 22. The details of such control and detecting devices, equipment and photo-electric multiplier assembly are more fully explained in our copending application, Serial No. 241,334, filed August 10, 1951.

It will be appreciated that various radiation sources may be utilized, and that such sources may be variously arranged with respect to the scintillation crystal. The radiations may be obtained from a source, for example, such as a radium-beryllium preparation or a polonium-beryllium preparation, or may be artificially produced as by a linear accelerator or other suitable device. One embodiment, as shown in FIG. 2, utilizes an arrangement commonly known as the neutron howitzer, wherein the neutron source 20 is positioned centrally of the lower surface of a generally conical layer of metallic lead, as indicated by the numeral 23, which is physically spaced and separated from the crystal 19 by a series of superposed layers of absorbing materials, as generally indicated by the numeral 25. In the present instance, the absorbers have been shown as comprising layers or plastic material, cadmium, and lead or other suitable metals such as tungsten or heavy alloys. Below the neutron source, there is also placed a relatively thick layer of plastic material, as indicated by the numeral 26. As thus arranged, the crystal 19 is shielded against direct bombardment by neutrons radiating from the neutron source 20, and the shape of the conical layer of lead 23 will act to beam fast neutrons from the neutron source into the adjacent structural formations along a path, for example, as indicated by numeral 24.

Entrance of the fast neutrons into the formation results in their being scattered and slowed down by collision with nuclei in the formation. Hydrogen plays a very important part in the process of slowing down the fast neutrons, inasmuch as the neutron-nucleous collision cross-section for hydrogen scattering is of the order of 20 barns, while most of the more common elements, such as iron is 4.1 barns, oxygen 4.1 barns, and silicon 1.7 barns. Thus, if these various elements were in the formation in equal quantities, the chances of a neutron striking a hydrogen atom would be of the order of five times as great as that of a neutron strking iron or oxygen or about twelve times as great as for silica. In addition to the above action, the slowing down process of the neutron is also important. Because the hydrogen weight is very close to the wtight of the neutron, more energy is lost by collision with hydrogen than other elements which might be present. For example, it has heretofore been shown that approximately six times as much energy is lost by collision with hydrogen as is lost by collision with oxygen. The effect therefore of hydrogen on neutrons would be approximately thirty times as great as the effect of oxygen on neutrons.

In the method of the present invention, it is proposed to detect the fast neutron flux before it reaches or falls to the low energy level of the slow or thermal neutron. Thus the disadvantages inherent in the utilization of thermal or slow neutrons as a measure of formation characteristics, are largely elminated and a more true indication of hydrogen content is possible.

One such disadvantage is indicated by consideration of FIG. 5. This graph shows in a curve $a$ the count or strength of slow neutrons as plotted against distance of travel in inches through a material containing hydrogen. From this curve, it will be seen that the slow neutrons increase rapidly from zero and reach a peak at approximately the 4 inch distance in the material, and that as the distance continues to increase the amount of slow neutrons rapidly diminishes. On the other hand, curve $b$ for fast neutrons shows a substantially uniform decrease in the number of fast neutrons as the distance increases. In those systems relying upon the utilization of slow neutrons as an indication of the formation structure, it will at once be apparent that erroneous results may be obtained by not being able to distinguish as to whether the increase or decrease is due to elements in the formation, or whether it is simply due to the distance or amount of hydrogen contained in the formation. Thus two indications of the same count might be obtained. On the other hand by utilizing the fast neutron, which is detected after relatively few collisions, the count will depend substantially upon the amount of hydrogen in the formation through which the neutrons have passed, and a single more reliable reading is obtained.

While apparatus has been described according to the present invention, wherein an anthracene crystal is utilized in connection with the detecting means, it will be appreciated that other materials may be utilized without departing from the spirit of the present invention. For example, activated lithium iodide may be utilized. This has the property of reacting to the effect of both fast and thermal neutrons. In order, therefore, that our method may be practiced when utilizing lithium iodide, it is proposed to surround the crystal material with a suitable material which will act to capture or shield the crystal from thermal neutrons. As an example, an envelope may be utilized which has a boron plated surface. The boron has the characteristic of capturing thermal neutrons, but permitting the passage of fast neutrons. Thus the boron acts as a discriminator so that the lithium iodide reacts under the effect of fast neutrons from which an indication of the formation characteristics is obtained.

An envelope 27 containing boron is disclosed in FIG. 3 as extending over the crystal 19 and the adjacent end of the photo-electric tube 21.

In order to secure high sensitivity, it is desirable to utilize the light scintillations of the crystal or crystals to the greatest extent. To this end diffuse reflectors have been arranged to reflect the light back into channels leading to the photo-electric multiplier tube. For such purpose, we have place a layer of magnesium oxide around the crystal or crystals except on the collecting side of the photo-electric tube. This material has a reflecting characteristic and reduces the amount of light losses in nonuseful directions.

Referring to FIG. 4, a modified arrangement is disclosed wherein the sensitivity is further increased by utilizing a plurality of crystals 19' and 19" which are positioned to receive scattered fast neutrons from the formation. In this case the light scintillations from the respective crystals are conducted through light conducting channels to the photo-electric tube 21. For such purpose it is proposed to utilize so-called light pipes of a material such as lucite or other suitable material having the property of guiding the movement of light emanations and forming therefor a conductor. In the present instance, these light pipes are shown as being formed by lucite rods 28' and 28" which respectively connect the crystals 19' and 19" with the photo-electric tube 21, so that greater sensitivity may be obtained in the detecting means by utilizing the combined effect of a plurality of crystals.

The method and apparatus as described herein have been successfully utilized with gratifying results in a number of wells, and good indications of the structural formations thus obtained. It is therefore appreciated that various modifications may suggest themselves to those skilled in the art without departing from the spirit of the present invention, and hence, we do not wish to be restricted to the specific form or forms shown or uses mentioned, except to the extent idicated in the appended claims.

We claim:

1. Apparatus for geophysical exploration of ground formations, comprising: a neutron-emitting source arranged to radiate neutrons into the formation; a plurality of crystals positioned to receive scattered neutrons from said formation, said crystals being adapted to scintillate under the action of fast neutrons; detecting means including a photo-electric cell; and a plastic light pipe interconnecting each of said crystals with said cell so as to collectively concentrate the scintillations from said crystals.

2. In apparatus for geophysical exploration of ground formations, comprising: a neutron-emitting source arranged to radiate neutrons into the formation; a plurality of crystals positioned to receive scattered neutrons from said formation, said crystals being adapted to scintillate under the action of fast neutrons; detecting means including a photo-electric cell; and a light conducting medium interconnecting each of said crystals with said cell, whereby the scintillations from said crystals are collectively concentrated.

3. Apparatus for geophysical exploration of ground formations, comprising: a neutron-emitting source arranged to radiate neutrons into the formation; a lithium iodide crystal in the path of scattered neutrons from said formations; means for shielding said crystal with respect to thermal neutrons from said formation, whereby reactions in said crystal will result from fast neutrons emanating from said formation; and means for logging only the fast neutron reactions from said crystal.

References Cited by the Examiner

UNITED STATES PATENTS

| | | | |
|---|---|---|---|
| 2,303,688 | 12/1942 | Fearon | 250—83 |
| 2,308,361 | 1/1943 | Fearon | 250—83 |
| 2,508,772 | 5/1950 | Pontecorvo | 250—83 |
| 2,530,932 | 12/1950 | Sun | 250—83.6 |
| 2,539,203 | 1/1951 | Pohl | 250—71 |
| 2,550,106 | 4/1951 | Coltman et al. | 250—83.3 |
| 2,559,219 | 7/1951 | Ludeman | 250—83 |
| 2,648,012 | 8/1953 | Scherbatskoy | 250—71 |

RALPH G. NILSON, *Primary Examiner.*

GEORGE R. DOUGLAS, ELI J. SAX, *Examiners.*

UNITED STATES PATENT OFFICE
CERTIFICATE OF CORRECTION

Patent No. 3,223,839                  December 14, 1965

Philip W. Martin et al.

It is hereby certified that error appears in the above numbered patent requiring correction and that the said Letters Patent should read as corrected below.

Column 4, line 15, for "strking" read -- striking --; line 19, for "wtight" read -- weight --; line 32, for "elminated" read -- eliminated --; column 5, line 9, for "place" read -- placed --; column 6, line 35, for "2,530,932" read -- 2,534,932 --.

Signed and sealed this 23rd day of August 1966.

(SEAL)
Attest:

ERNEST W. SWIDER                      EDWARD J. BRENNER
Attesting Officer                      Commissioner of Patents